US 8,782,440 B2

(12) United States Patent
Nin et al.

(10) Patent No.: US 8,782,440 B2
(45) Date of Patent: Jul. 15, 2014

(54) EXTENDING THE NUMBER OF APPLICATIONS FOR ACCESSING PROTECTED CONTENT IN A MEDIA USING MEDIA KEY BLOCKS

(75) Inventors: Sigfredo I. Nin, San Jose, CA (US); Dulce B. Ponceleon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/586,861

(22) Filed: Aug. 15, 2012

(65) Prior Publication Data

US 2014/0052996 A1    Feb. 20, 2014

(51) Int. Cl.
*G06F 21/00*    (2013.01)
*G06F 11/30*    (2006.01)
*G06F 7/04*    (2006.01)
*G06F 17/30*    (2006.01)
*H04N 7/16*    (2011.01)

(52) U.S. Cl.
USPC ............... 713/193; 713/189; 726/26; 726/27

(58) Field of Classification Search
USPC ........ 713/189, 193; 711/163, 164; 726/26–30
See application file for complete search history.

(56) References Cited

U.S. PATENT DOCUMENTS

| | | | |
|---|---|---|---|
| 6,832,319 B1 | 12/2004 | Bell et al. | |
| 6,993,135 B2* | 1/2006 | Ishibashi | 380/277 |
| 7,039,803 B2 | 5/2006 | Lotspiech et al. | |
| 7,721,343 B2* | 5/2010 | Kato et al. | 726/27 |
| 8,116,452 B2* | 2/2012 | Yamamoto et al. | 380/201 |
| 8,312,294 B2* | 11/2012 | Sato et al. | 713/193 |
| 2007/0067244 A1 | 3/2007 | Jin et al. | |
| 2008/0279376 A1 | 11/2008 | Jin et al. | |
| 2009/0022318 A1 | 1/2009 | Kasahara et al. | |
| 2009/0319791 A1 | 12/2009 | Aiyoshi et al. | |
| 2010/0118675 A1* | 5/2010 | Nakano et al. | 369/53.21 |
| 2010/0183148 A1 | 7/2010 | Bellwood et al. | |
| 2011/0026713 A1* | 2/2011 | Bellwood et al. | 380/277 |
| 2012/0096284 A1* | 4/2012 | Matsukawa et al. | 713/193 |

FOREIGN PATENT DOCUMENTS

| | | | |
|---|---|---|---|
| JP | 02011030275 A | | 2/2011 |
| JP | 2010268417 A | | 11/2011 |

OTHER PUBLICATIONS

Lee et al., "Clone Resistant Mutual Authentication Using Two Broadcast Encryption", IEEE, 2009.
4C Entity, "Content Protection for Recordable Media Specification," Revision 0.94, 2011.
4C Entity, "Content Protection System Architecture a Comprehensive Framework for Content Protection," Revision 0.81, Feb. 17, 2000.

* cited by examiner

*Primary Examiner* — Saleh Najjar
*Assistant Examiner* — Feliciano Mejia
(74) *Attorney, Agent, or Firm* — Mohammed Kashef; Yusuke Kanehira; Brian Lambert

(57) ABSTRACT

Embodiments of the invention relate to digital content protection for recordable media using encryption and decryption based on device keys in the media. The invention increases the number of extended applications supported the media key blocks and facilitates the assignment of the applications to the media key blocks. One aspect of the invention concerns a method that comprises assigning a first media key block in a protected area of the media for extended applications accessing protected content, processing the first media key block with a first device key set to generate a first media key, and for each extended application, creating a second media key block in a protected area of the media. The second media key block is processed to generate a second media key. A content-accessing device processes the first and second media keys in order to access protected content.

20 Claims, 7 Drawing Sheets

EXTENDING THE NUMBER OF APPLICATIONS FOR ACCESSING PROTECTED CONTENT IN A MEDIA USING MEDIA KEY BLOCKS

BACKGROUND

The invention relates generally to data protection, and more particularly, to methods and systems for extending the number of applications that access protected digital content in recordable media using encrypted media key blocks in the media.

Entertainment information such as music and movies is increasingly being marketed to consumers in the form of digital media such as compact discs (CDs) and digital versatile discs (DVDs). At the same time, computers and consumer devices become more advanced and allow contents in the media to be copied if the contents are not properly protected.

In an effort to prevent unauthorized copying and redistribution of digital information, content providers and device manufacturers have jointly defined standards and technologies to protect the distributed contents, such as the Content Protection for Recordable Media (CRPM) and Content Protection for Extended Media (CPXM) standards provided by the 4C Entity (www.4centity.com). These technologies are licensed by licensing entities, e.g., the 4C Licensing Authority, to manufacturers that produce the protection devices and consumer equipment incorporating the protection implementations.

The CRPM protection standard enables protected exchange of audio/visual content recorded on various portable data storage media types, including DVD, SD memory card, and compact flash media. CPRM ties the recorded content to a media on which the content is recorded and is supported by all DVD recorders released after 1999. Each recordable media includes a media ID and a number of media key blocks (MKBs) in its protected area for supporting a fixed number of applications that can access the media. When protected contents are recorded onto the media, they can be encrypted with a set of keys derived from the media ID and media key blocks. During playback, the media ID is read from the protected area and used to generate a key to decrypt the contents of the media. If the contents of the media are copied to other media, the media ID will be absent or wrong and the contents cannot be decrypted.

For SD card applications, the SD Association assigns applications to MKBs, and defines the data structures on the media that support the application. The 4C Licensing Authority further manages the licensing of CPRM adopters and provides device key sets to manufacturers of media players and recorder, and SD cards. Currently, each SD card includes a relatively small number of sixteen media key blocks that may be assigned to applications. Furthermore, providing new applications for a media requires action from both the 4C Licensing Authority and the SD Association in the application assignment process.

It is desirable to extend the number of applications that can access content in a CPRM protected media and facilitate the MKB assignment process when new applications are introduced.

BRIEF SUMMARY

Exemplary embodiments of the invention relate to extending the number of applications that can access digital content in CPRM-protected media and devices using a media key block in a protected area of the media and a second media key block in a System Area of the media. The embodiments of the invention may be implemented in a CPRM-protected media such as a DVD or a SD memory card, and devices, recorders and players that access protected contents in such media.

One aspect of the invention concerns a computer-implemented method of protecting content in a media. The method may comprise assigning a first media key block in a protected area of the media for extended applications accessing the protected content; processing the first media key block with a first device key set to generate a first media key; and for each particular extended application, processing a second media key block associated with the particular extended application with a second device key set to generate a second media key, wherein the second media key block is in a user area of the media. A content-accessing device processes the first and second media keys in order to access the protected content.

Another aspect of the invention concerns a system for protecting content in a media. The system may comprise a media including content to be protected, and a processor coupled to the media and configured to assign a first media key block in a protected area of the media for extended applications accessing the protected content; process the first media key block with a first device key set to generate a first media key; and for each particular extended application, process a second media key block associated with the particular extended application with a second device key set to generate a second media key, wherein the second media key block is in a user area of the media. A content-accessing device processes the first and second media keys in order to access the protected content.

A further aspect of the invention concerns a computer program product for protecting content in a media. The computer program product comprises a computer readable storage medium having computer readable program code embodied therewith. The computer readable program code comprises computer readable program code configured to assign, for extended applications, a first media key block in a protected area of a media storing protected content; computer readable program code configured to process the first media key block with a first device key set to generate a first media key; and computer readable program code configured to process, for each particular extended application, a second media key block associated with the particular extended application with a second device key set to generate a second media key, wherein the second media key block is in a user area of the media. A content-using device processes first and second keys respectively generated from the first and second media key blocks to allow the extended application to access the protected content.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

Figure 1:
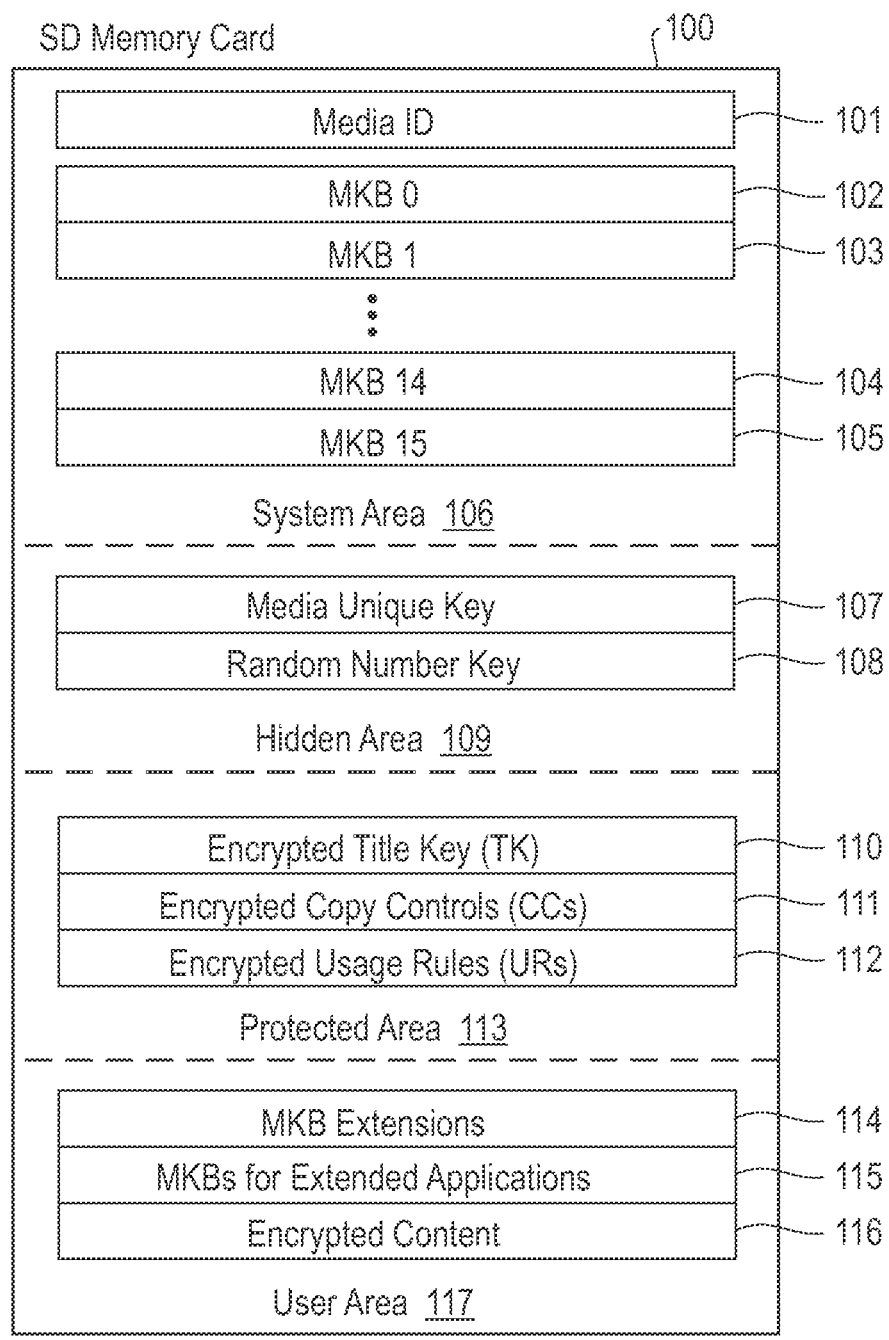
FIG. 1 illustrates an exemplary organization of content storage areas having different access restrictions in an SD memory card in which embodiments of the invention may be provided.

While the invention is illustrated and described in exemplary embodiments, the invention may be implemented in many different configurations, forms and materials. Embodiments of the invention, as depicted in the drawings and herein described in detail, are example embodiments of the invention and are not intended to limit the invention to the embodiments illustrated. Those skilled in the art will envision many other possible variations within the scope of the present invention.

The invention relates to methods, systems, and computer program products for protecting information stored in a media using a combination of media key blocks in the protected and System Areas of the media to enable an increased number of applications that can access the protected content. For the purpose of explaining the invention, exemplary embodiments will be described in the context of SD memory cards, however, the embodiments are not limited only to applications for SD memory cards and may be applicable to other media applications such as those for DVDs and Blue-ray discs.

SD cards are designed to enable storage of copy protected content through the use of CPRM—Copy Protection for Recordable Media. CPRM is based on a form of broadcast encryption. In broadcast encryption, a transmitter distributes a message to a large group of receivers encrypted so that only a previously chosen selection of them can decrypt it. In CPRM, each receiver has a set of device keys, one from each column of a matrix of keys, and the message is encrypted so that each of the intended recipients has at least one key that will enable it to decrypt the message, but the excluded receivers find that none of their keys will decrypt the message.

Referring now to the drawings and in particular to FIG. 1, there is illustrated an exemplary organization of storage areas in an SD memory card 100 that have different access restrictions in which embodiments of the invention may be provided. In SD memory cards, the broadcast message is the copy protected content, and the potential receivers of the message are players with SD card slots that have CPRM device keys for one of more SD card data formats. The SD card data formats are referred to as SD applications. Examples of SD applications are SD-Audio and SD-Video applications.

The SD memory card 100 may comprise a System Area 106 that contains a unique media identifier 101 for identifying the SD memory card and media key blocks (MKBs) 102-105 that contain media keys for content encryption and decryption. The System Area 106 may be accessed by device level SD memory card commands. Current SD memory cards generally include 16 MKBs designated as MKB0-MKB15 (102-105). A Hidden Area 109 in the SD memory card 100 is reserved for the Media Unique Key 107 and a Random Number Key 108. The Hidden Area 109 is only accessible to the memory controller on the card, and not to a content player or recorder.

Content protected with CPRM on the SD card 100 may be encrypted with a Title Key 110, which is in turn encrypted with the Media Unique Key 107 associated with the application that the content is intended for. The application calculates the Media Unique Key 107 by combining the Media ID 101 with a Media Key distributed with the content in one of the media key blocks (MKBs) 102-105. This particular MKB 102-105 may contain many copies of the Media Key that the application uses to calculate the Media Unique Key 107, where each Media Key is encrypted with a different device key from a content recorder. To gain access to the content, a player must process this MKB 102-105 to find from the MKB an instance of the Media Key encrypted with one of the device keys that the player is provided with. If the player finds this instance of the encrypted Media Key, then the player can play the protected content that is recorded on the media.

Under some circumstances, it may be desirable to further restrict the list of devices that can access CPRM-protected contents on a media 100 by requiring the devices to process an extension MKB 114. To process an extension MKB 114, a content receiver such as a player needs the Media Key from the base MKB. Thus, the player must successfully process the base MKB before it can process the extension. In SD cards, an MKB extension may be used if the base MKB is one of the MKBs in the System Area that is designated as a read-only MKB.

The base MKB for each application may be stored in the System Area 106 of an SD memory card 100. Encrypted Title Keys (TKs) 110, Copy Control (CC) information 111, and Usage Rules (URs) 112, may be stored in the Protected Area 113 of the SD card, which can only be accessed after a device proves that it can process an MKB by successfully executing a mutual authentication protocol with the SD card 100. Encrypted application content 116 and extension MKBs 114-115 may be stored in the User Area 117 of the SD card 100, which looks to the player like a file allocation table (FAT) partition on a disk.

Current SD cards 100 that are protected by CPRM can support a fixed number of applications, limited by the number of MKBs 102-105 in the System Area 106 of the SD card 100. There are currently 16 MKBs in an SD card that may be organized as illustrated in Table 1. Among the 16 MKBs, 15 MKBs are application MKBs and the 16th is a Master MKB that enables replacement of the 8 updatable MKBs, including itself.

TABLE 1

| MEDIA KEY BLOCK | TYPE | USAGE |
| --- | --- | --- |
| MKB 0 | Read Only | For SD-Audio |
| MKB 1 | Read Only | Reserved |
| MKB 2 | Read Only | Reserved |
| MKB 3 | Read Only | Reserved |
| MKB 4 | Read Only | Reserved |

TABLE 1-continued

| MEDIA KEY BLOCK | TYPE | USAGE |
| --- | --- | --- |
| MKB 5 | Read Only | Reserved |
| MKB 6 | Read Only | Reserved |
| MKB 7 | Read Only | Reserved |
| MKB 8 | Updateable | SD-Audio Extension |
| MKB 9 | Updateable | For SD-Video |
| MKB 10 | Updateable | For SD-ePublish |
| MKB 11 | Updateable | For SD-Binding |
| MKB 12 | Updateable | Reserved |
| MKB 13 | Updateable | Reserved |
| MKB 14 | Updateable | Reserved |
| MKB 15 | Updateable | Master |

The SD Association assigns applications to MKBs 102-105, and defines the data structure on the SD card 100 that supports the applications. The 4C Licensing Authority manages licensing of CPRM adopters and provides device key sets to manufacturers of SD card players and recorders, and MKBs 102-105 to manufacturers of SD cards. An introduction of new applications for an SD card 100 requires action from both SD Association (SDA) and 4C Licensing Authority (4C LA). One drawback of this procedure is the delay in obtaining the device key set assignment before a new application can be released. Another drawback is that there is currently no mechanism for introducing proprietary secure applications.

The above limitations are also present in the design of CPXM, a proposed extension to CPRM. The introduction of CPXM is motivated by the desire to provide up-to-date cryptographic security for valuable High-Definition Video content. In CPXM, the underlying broadcast encryption is the subset-difference scheme of Naor, Naor, and Lotspiech, known as NNL, and the underlying cipher is AES. The CPXM applications also require MKBs 102-105, which use NNL device keys and AES cipher rather than the matrix-based device keys and C2 cipher of CPRM. However, for backward compatibility, the new SD cards would still have to be manufactured with CPRM MKBs as well as CPXM MKBs. SD card manufacturers, however, are reluctant to dedicate more space on the card for CPXM MKBs, or to pay for MKBs that are likely to never be used.

Embodiments of the invention increase the number of extended applications that can access protected content in an SD card 100 by providing systems and methods of defining new applications that require only one MKB in the System Area 106, and action only by 4C LA to authorize a new application, be it CPRM or CPXM. In one embodiment, the invention uses a first MKB in the System Area 106 of an SD card 100 to calculate a first media key, and a second MKB in the User Area 117 of the SD card 100 to calculate a second media key. The two MKBs are independent from each other. A media player or recorder then uses the first and second MKBs to calculate the media keys that it needs to access the encrypted content 116 in the SD card 100.

In an exemplary embodiment, one of the MKBs 102-105 in the System Area 106 of an SD card 100 may be reserved for the extended applications. This MKB is hereafter referred to as the Extended Applications MKB. An extended application uses a second MKB in the User Area 117, thereafter referred to as an extension MKB, which encodes a media key using a separate set of device keys. A player or recorder that implements this particular extended application would need two sets of device keys in order to encrypt or decrypt the protected content 116, one for the first Extended Applications MKB in the System Area 106 of the SD memory card 100, and one for a second extension MKB (that is associated with this particular extended application) in the User Area 117 of the SD memory card 100.

Under the current CPRM authorization process, an action by the 4C Licensing Authority is needed to create a new device key matrix for each new application, and to manufacture device key sets and MKBs. Thereafter, only one action by the SDA would be needed to designate an Extended Applications MKB in the System Area 106, and no SDA action is required to assign an MKB 102-105 for a new extended application.

Figure 2:
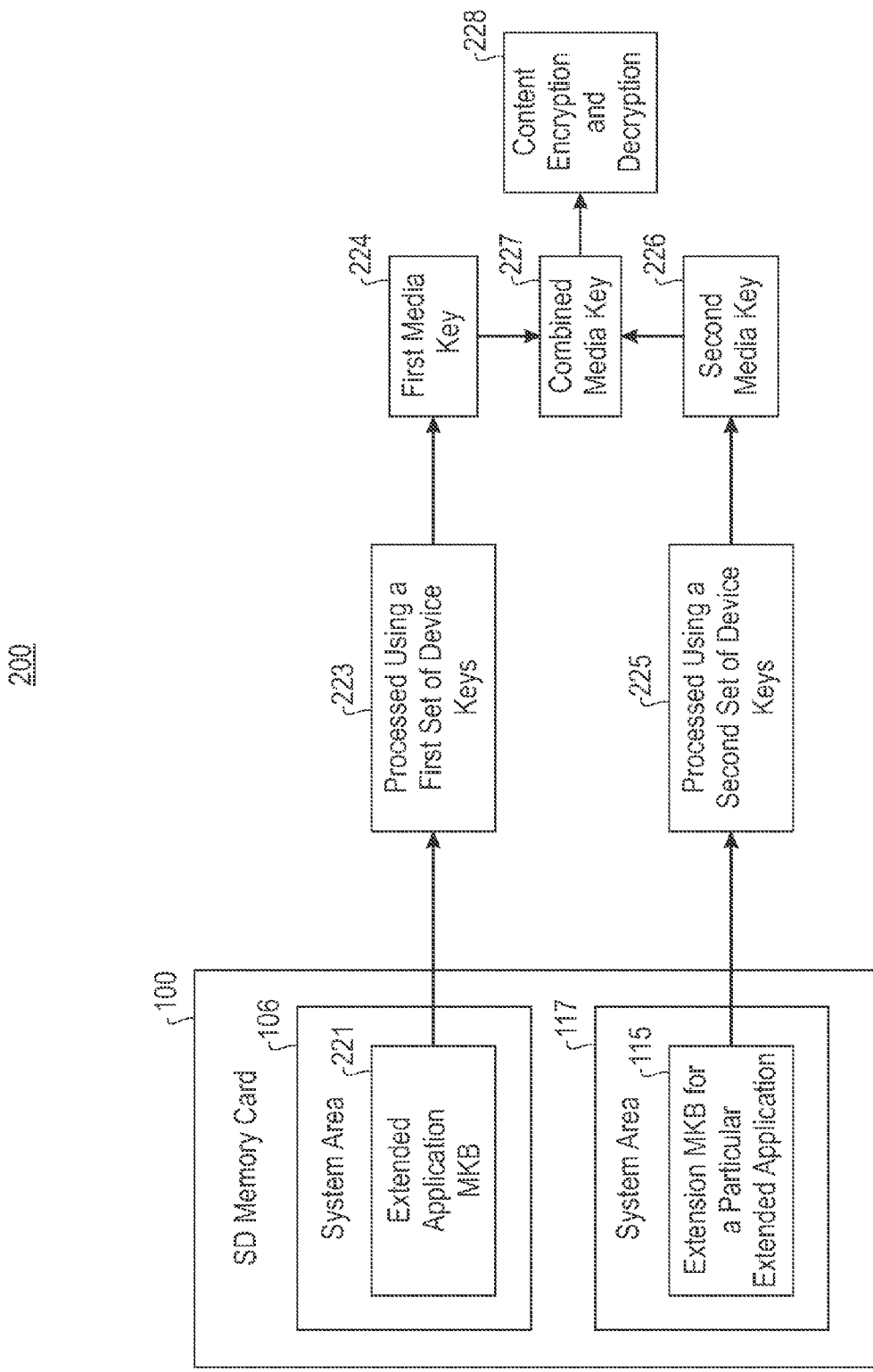
FIG. 2 illustrates a high-level block diagram of a system for extending the number of applications that can access protected content in an SD memory card in accordance with an exemplary embodiment of the invention.

FIG. 2 illustrates a high-level block diagram of a system 200 for extending the number of applications that access protected content in an SD memory card, according to embodiment of the invention. As an example, the SD card 100 may include an Extended Applications MKB 221 in the protected System Area 106 (i.e., one of the MKBs 102-105) that is designated for extended applications. In addition, a second extension MKB 115 in the User Area 117 is designated for each particular extended SD application that accesses the protected content on the SD card 100. A player or recorder then processes both the Extended Applications MKB 221 and extension MKB 115 in order to access the protected content on the SD card 100.

In one embodiment, the player or recorder processes the Extended Applications MKB 221 using a first set of device keys (block 223) to generate a first media key 224. In addition, the player or recorder processes the extension MKB 115 using a second set of device keys (block 225) to generate a second media key 226. The first media key 224 and second media key 226 are combined to form a new media key 227, which is then used to encrypt the protected content 116 by a media recorder or decrypt the content 116 by a media player as shown by block 228.

The second extension MKB 115 for a particular extended application may be recorded as an extension to the first Extended Applications MKB 221, thus requiring a player or recorder to successfully process the first Extended Applications MKB 221 before it can process the second extension MKB 115. Alternatively, the first Extended Applications MKB 221 may be an independent base MKB, and the player or recorder may need to combine (e.g., by an exclusive-OR operation) the media key that it calculates with the media key from the Extended Applications MKB 221 to produce the final media key that enables the player or recorder to access the protected application content.

The function used to combine the independently calculated media keys from the Extended Applications MKB 221 from the System 106 and second extension MKB 115 from the User Area 117 need not be an XOR operation. Any function that combines all of the bits in the keys and retains the full output range may be used. For example, if the two MKBs 221 and 115 between them produce two 64-bit media key values, the media keys can be appended to form a 128-bit AES key. The processing of the MKBs 115 and 221 to generate media keys is described in detail below with reference to FIGS. 3-6.

The Extended Applications MKB 221 in the System Area 106 can be either an updateable or read-only MKB. If the MKB 221 is a read-only MKB, a content-accessing device may be required to process an extension MKB 115, if present, using its Extended Applications device key set 223, before processing the second extension MKB 115 in the User Area 117 of the SD card 100 for the individual application.

The second extension MKB 115 in the User Area 117 does not need to use the same technology as the first Extended Applications MKB 221 in the System Area 106. In an exemplary embodiment for a CPRM-implemented SD card 100, the second extension MKB 115 in the User Area 117 of the SD card 100 may be a CPXM MKB using NNL technology.

Figure 3:
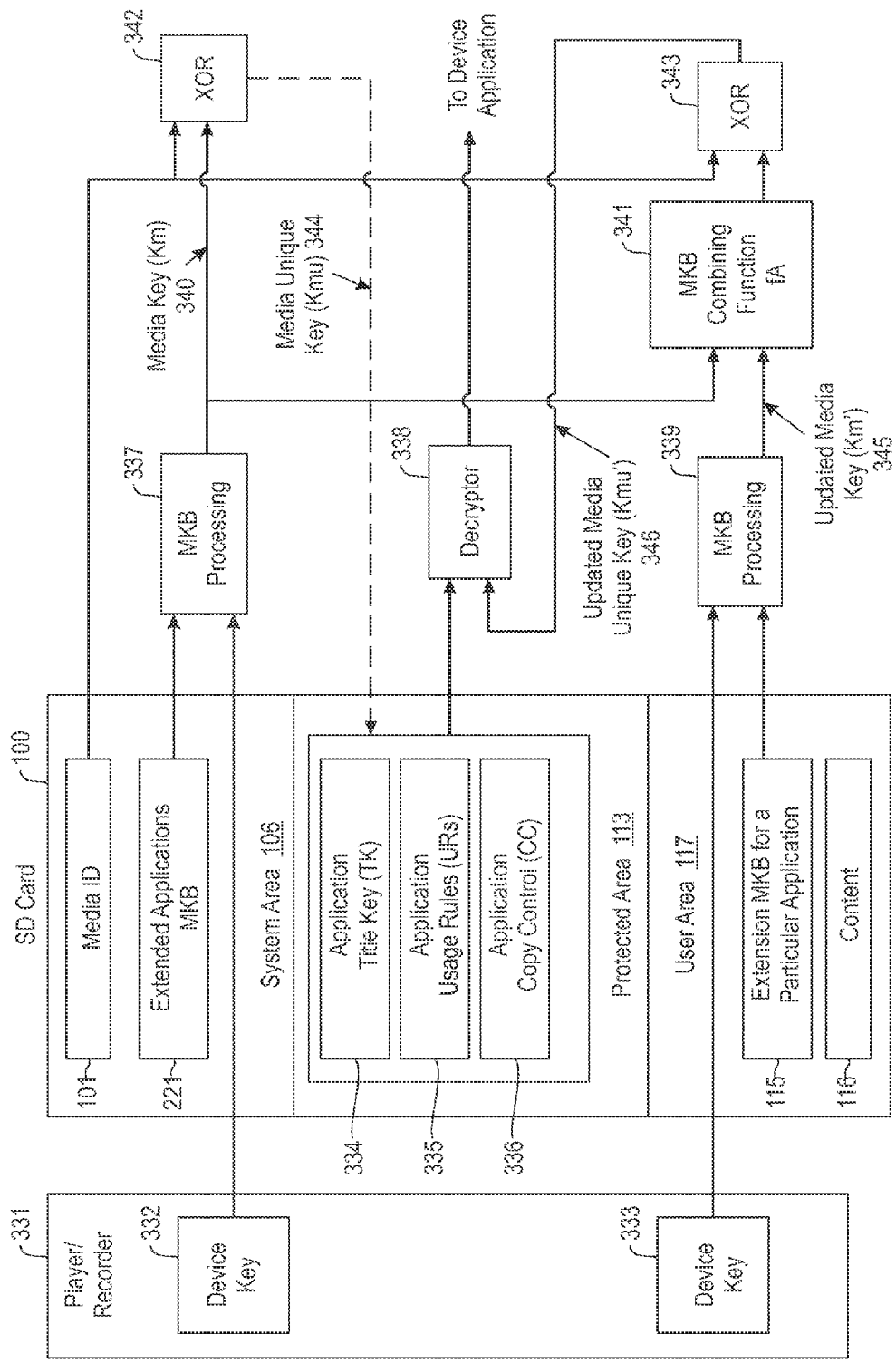
FIG. 3 illustrates a detailed block diagram of a system for extending the number of applications that a player or recorder can access protected content in an SD memory card in accordance with an exemplary embodiment of the invention.

FIG. 3 illustrates a block diagram of a system 300 for extending the number of applications that a player or recorder can access protected content in an SD memory card in accordance with an exemplary embodiment of the invention. The storage of content in the SD memory card 100 using CPRM protection is based on the interaction of two components: a player or recorder 331 and the SD memory card 100 itself. While the player or recorder 331 has its own device keys 332-333, the SD memory card 100 contains a media ID 101 that is unique for each SD memory card 100. The User Area 117 of the SD memory card 100 includes an extension MKB 115 for a specific extended application that the player or recorder 331 (a media accessing device) implements for accessing the CPRM-protected content 116. The device keys 332-333, media ID 101, and extension MKB 115 are used to generate new keys, pass authentication procedures, and get access to read or write encrypted content 116 on the SD card 100.

A CPRM SD card application player 331 executes a procedure that results in it getting access to application Title Key 334 that the application player 331 needs to decrypt (e.g., by a decryptor 338) the content 116, and obtain Usage Rules 335 and Copy Controls 336 that the application player 331 must abide by. The application player 331 now can access the decrypted content 116 using the Usage Rules 335 and Copy Controls 336.

A CPRM SD card application recorder 331 executes a similar procedure that results in it getting the keys it needs to encrypt and record the content 116, application Title Key 334, Usage Rules 335, and Copy Controls 336 that player 331 must abide by when playing back the recorded content 116. In the recording process, the application Title Key 334, Usage Rules 335, and Copy Controls 336 are encrypted in a manner that binds them to the specific SD card 100 on which they are recorded.

If data files containing the encrypted content 116 in the User Area 117 of the SD card 100 are copied to the User Area 117 of another SD card, and even if the encrypted Title Key 334, Usage Rules 335, and Copy Controls 336 are also copied from the Protected Area 113 of the SD card 100 to the Protected Area 113 of another SD card, the encrypted content 116 will not be playable because it is cryptographically bound to the SD card 100 on which the recorder 331 has recorded the encrypted content 116.

In an exemplary embodiment of the invention, the process that a application player 331 uses to generate a Media Unique Key 107 to access and play the protected content 116 may include SD card commands to retrieve the media ID 101 and an Extended Applications MKB 221 from the System Area 106 of the SD card 100. The player 331 then uses its CPRM device keys 332 to process the Extended Applications MKB 221. This computation yields a media key (Km) 340 if the access authorization for the player 331 has not been revoked. The media key (Km) 340 may be exclusively OR'ed (by operation 342) with the media ID 101 to form a media unique key (Kmu) 344. The media unique key (Kmu) 344 enables the player 331 to read the application Title Key (TK) 334, Usage Rules (URs) 335, and Copy Controls (CCs) 346 in the Protected Area 113 of the SD card 100.

If there are no extension MKBs for extended applications in the User Area 117 of the SD card 100, then the player 331 may proceed to decrypt (at block 338) the encrypted data using the application Title Key (TK) 334, Usage Rules (URs) 335, and content Copy Controls (CCs) 336. Any content data 116 that is encrypted with the calculated Media Unique Key (Kmu) 344 is bound to the single SD card 100 that has the media ID 101 used to calculate the Media Unique Key (Kmu) 344.

If the player 331 finds an extension MKB 115 for a particular SD card application in the User Area 117 of the SD card 100, the player 331 uses its CPRM Device Keys 333 to process the extension MKB 115. This computation yields an updated media key (Km') 345, if access by the player 331 has not been revoked based on the extension MKB 115. The player 331 then uses the updated media key (Km') 345 in place of the media key (Km) 340 that it calculated earlier to derive an updated Media Unique Key (Kmu') 346. In one embodiment, the Media Unique Key (Kmu') 346 is generated by combining the media key (Km) 340 and the updated media key (Km') 345 by a combining function (fA) 341. The combing function (fA) 341 may comprise a simple XOR operation, provided separate means are provided to detect if either MKB has revoked the device key used. However, any function that combines all of the bits in the keys and retains the full output range may be used. Examples of usable functions include encryption and cryptographic one-way functions. In one embodiment, the output from the combining function fA (341) may be exclusively-OR'ed (at block 343) with the media ID 101 to generate the update Media Unique Key (Kmu') 346.

At block 338, the player 331 decrypts the protected content in the SD card 100, which is in the form of encrypted data, using the application Title Key (TK) 334, Usage Rules (URs) 335, Copy Controls (CCs) 336, and the updated Media Unique Key (Kmu') 346. Any data that is encrypted with the updated Media Unique Key (Kmu') 346 is bound to the single SD card 100 that has the media ID 101 used to calculate this Media Unique Key (Kmu') 346.

In an exemplary embodiment of the content decryption process, the player 331 uses the Media Unique Key (Kmu) 344 to execute an authentication protocol with the SD card 100. As a result of successfully executing this protocol, both the player 331 and the SD card 100 calculate a session key which the player 331 uses for accessing Title Key 334, Usage Rules 335, and Copy Controls 336 in the Protected Area 113 of the SD card 100.

The player 331 reads the Title Key 334, Usage Rules 335, and Copy Controls 336 from a system file in the Protected Area 113 of the SD card 100, and decrypts these elements first with the session key, and then with the updated Media Unique Key (Kmu') 346. The player 331 verifies that the playback operation it is executing is allowed by the Usage Rules. If the playback operation is not allowed, the player 331 stops the playback.

The player 331 next reads content data from the User Area 117 of the SD card 100 and decrypts the content data with the Title Key 334. The player 331 continues to play content stored on the media as commanded, as long as the playback is allowed by Usage Rules 335.

The recording process used by a content recorder 331 may be similar to the playing process described above except for the encryption steps. In an exemplary embodiment, the recorder 331 encrypts the Title Key 334, Usage Rules 335, and Copy Controls 336 first with the updated Media Unique Key (Kmu') 346, then with the calculated session key. The recorder 331 writes the encrypted Title Key 334, Usage Rules 335, and Copy Controls 336 to a file in the Protected Area 113 of the SD card 100. The recorder 331 further encrypts the content to be recorded on the media with the Title Key 334 and writes the encrypted content to the User Area 117 of the SD card 100.

Figure 4:
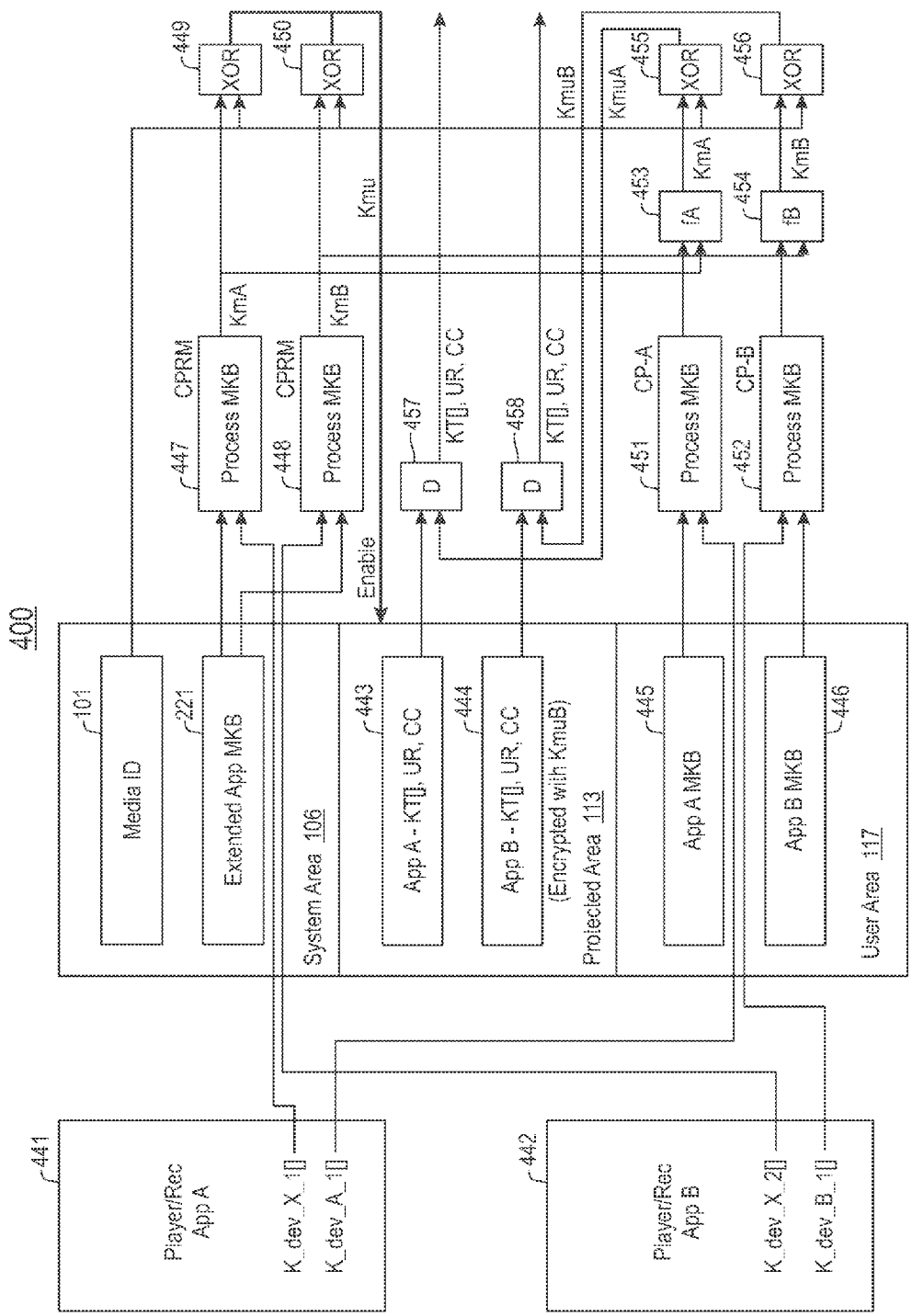
FIG. 4 illustrates a block diagram of a system for extending the number of applications in which multiple player or recorder applications access protected content in an SD memory card using their respective media key blocks, in accordance with an exemplary embodiment of the invention.

FIG. 4 illustrates a block diagram of a system 400 for extending the number of applications in which multiple player or recorder applications process different media key blocks to access protected content in an SD memory card, according to an exemplary embodiment of the invention. As an example, the system 400 includes two player or recorder applications A and B (441 and 442) that both access the encrypted data stored on the SD memory card 100. Although applications A and B use the same media ID 101 and Extended Applications MKB 221 in the System Area 106, they are respectively associated with different extension MKBs 445 and 446 in the User Area 117.

The system 400 in FIG. 4 may comprise processing components similar to those in the system illustrated in FIG. 3 except that they use different device keys, and process different extension MKBs in the User Area 117 that are respectively associated with the different player or recorder applications 441 and 442. The applications 441-442 use different device key sets to process the same Extended Applications MKB 221 in the System Area 106. For a player or recorder application A (441), the system 400 may use a device key set K_dev_X1 to process the Extended Applications MKB 221 that the system 400 obtains from the System Area 106. For an SD card, the processing 447 may be based on the CPRM protocol as described, for example in U.S. Pat. No. 6,832,319. The processing 447 generates a media key Km for the application A (441). Both applications A and B (441-442) calculate the same media key Km when they process the same Extended Applications MKB 221 even though they use different device key sets to process it.

In one embodiment, the system combines the media key Km (e.g., by an XOR operation) with the media ID 101 associated with the SD memory card to produce a Media Unique Key Kmu. Since both applications A (441) and B (442) combine the same media key Km with the same media ID 101, they produce the same Media Unique Key Kmu. The system 400 uses the Media Unique Key Kmu to execute an authentication protocol with the SD card 100. As a result of successfully executing this protocol, both the player or recorder application A (441) and the SD card 100 calculate a session key which the player or recorder application A (441) uses for accessing Title Key (TK), Usage Rule (UR), and Copy Controls (CC) 443 in the Protected Area 113 of the SD card 100.

For a content recorder application A (441), the system 400 uses another device key set K_dev_A1 to process (block 451) an extension MKB 445 associated with application A 441 that the system 400 obtains from the User Area 117 of the SD memory card. This processing 451 may be based on a CP-A protocol that uses, for example, the NNL broadcast encryption described in U.S. Pat. No. 7,039,803. The output from the MKB processing 451 is combined with the media key Km by a function fA (block 453) to generate a media key KmA for the recorder application A (441). The combining function (fA) 341 may comprise a simple XOR, provided separate means are provided to detect if either MKB has revoked the device key used. However, any function that combines all of the bits in the keys and retains the full output range may be used. Examples of usable functions include encryption and cryptographic one-way functions.

In one embodiment, the media key KmA may next be XOR'ed (block 455) with the Media ID 101 to generate a Media Unique Key KmuA for the application A (441). The recorder application A (441) encrypts Title Key (TK), Usage Rule (UR), and Copy Control (CC) 443 first with the session key, and then with the Media Unique Key KmuA then stores these elements in the Protected Area 113 of the SD memory card 100. The recorder application A (441) further encrypts the content to be recorded on the media with the Title Key (KT) and writes the encrypted content to the User Area 117 of the SD card 100.

For a content player application A (441), the system 400 uses another device key set K_dev_A1 to process (block 451) an extension MKB 445 associated with application A 441 that the system 400 obtains from the User Area 117 of the SD memory card. This processing 451 may be based on a CP-A protocol that uses, for example, the NNL broadcast encryption described in U.S. Pat. No. 7,039,803. The output from the MKB processing 451 is combined with the media key Km by a function fA (block 453) to generate a media key KmA for the player application A (441). The combining function (fA) 341 may comprise a simple XOR operation, provided separate means are provided to detect if either MKB has revoked the device key used. However, any function that combines all of the bits in the keys and retains the full output range may be used. Examples of usable functions include encryption and cryptographic one-way functions.

In one embodiment, the media key KmA may next be XOR'ed (block 455) with the Media ID 101 to generate a Media Unique Key KmuA for the application A (441). The player application A (441) reads the encrypted Title Key (TK), Usage Rule (UR), and Copy Control (CC) 443 stored in the Protected Area 113 of the SD memory card 100 and decrypts these elements first with the session key, and then with the Media Unique Key KmuA. The player application A (441) further reads the encrypted content in the User Area 117 of the SD card 100 and decrypts it with the Title Key (TK).

The player or recorder application B (442) processes the media key blocks to generate the necessary keys to store and access content on the SD memory card 100 similarly to the player or recorder application A (441), but uses different device keys and media key blocks that are specifically associated with the application B (442) rather than those for application A (441). In particular, the system 400 may use device key set K_dev_X2 to process (block 448) the Extended Applications MKB 221 and generate a media key Km for the player or recorder application B (442), which has the same value as the media key Km calculated using device key set K_dev_X1 for application A (441).

In one embodiment of the invention, this media key Km may be XOR'ed (450) with the media ID 101 to generate a Media Unique Key Kmu for application B (442), which has the same value as the Media Unique Key Kmu calculated using media key Km for application A (441). The system 400 then uses this Media Unique Key Kmu to execute an authentication protocol with the SD card 100. As a result of successfully executing this protocol, both the player or recorder application B (442) and the SD card 100 calculate a session key which the player or recorder application B (442) uses for accessing the Title Key (TK), Usage Rule (UR), and Copy Control (CC) 444 in the Protected Area 113 of the SD card 100.

For a content recorder application B (442), the system 400 uses another device key set K_dev_B1 to process (block 452) an extension MKB 446 for Application B (442) that the system 400 obtains from the User Area 117 of the SD memory card 100. This processing 452 may be based on a CP-B protocol that is different from the CP-A protocol used by the content player application A (441). The output from processing 452 may be combined with the media key Km by function fA (454) to generate a media key KmB for the recorder application B (442). In one embodiment, the media key KmB may be XOR'ed (456) with the Media ID 101 to generate a Media Unique Key KmuB for the recorder application B (442). The recorder application B (442) encrypts Title Key (TK), Usage Rule (UR), and Copy Control (CC) 444 first with the Media Unique Key KmuB, and then with the session key, then stores these elements in the Protected Area 113 of the SD memory card 100. The recorder application B (442) further encrypts the content to be recorded on the media with the Title Key (TK) and writes the encrypted content to the User Area 117 of the SD card 100.

For a content player application B (442), the system 400 uses another device key set K_dev_B1 to process (block 452) an extension MKB 446 for Application B (442) that the system 400 obtains from the User Area 117 of the SD memory card 100. This processing 452 may be based on a CP-B protocol that is different from the CP-A protocol used by the content player application A (441). The output from processing 452 may be combined with the media key Km by function fA (454) to generate a media key KmB for the player application B (442). In one embodiment, the media key KmB may be XOR'ed (456) with the Media ID 101 to generate a Media Unique Key KmuB for the player application B (442). The player application B (442) reads the previously encrypted Title Key (TK), Usage Rule (UR), and Copy Control (CC) 444 stored in the Protected Area 113 of the SD memory card and decrypts these elements first with the session key, and then with the Media Unique Key KmuB. The player application B (442) further reads the encrypted content in the User Area 117 of the SD card 100 and decrypts it with the Title Key (TK).

Figure 5:
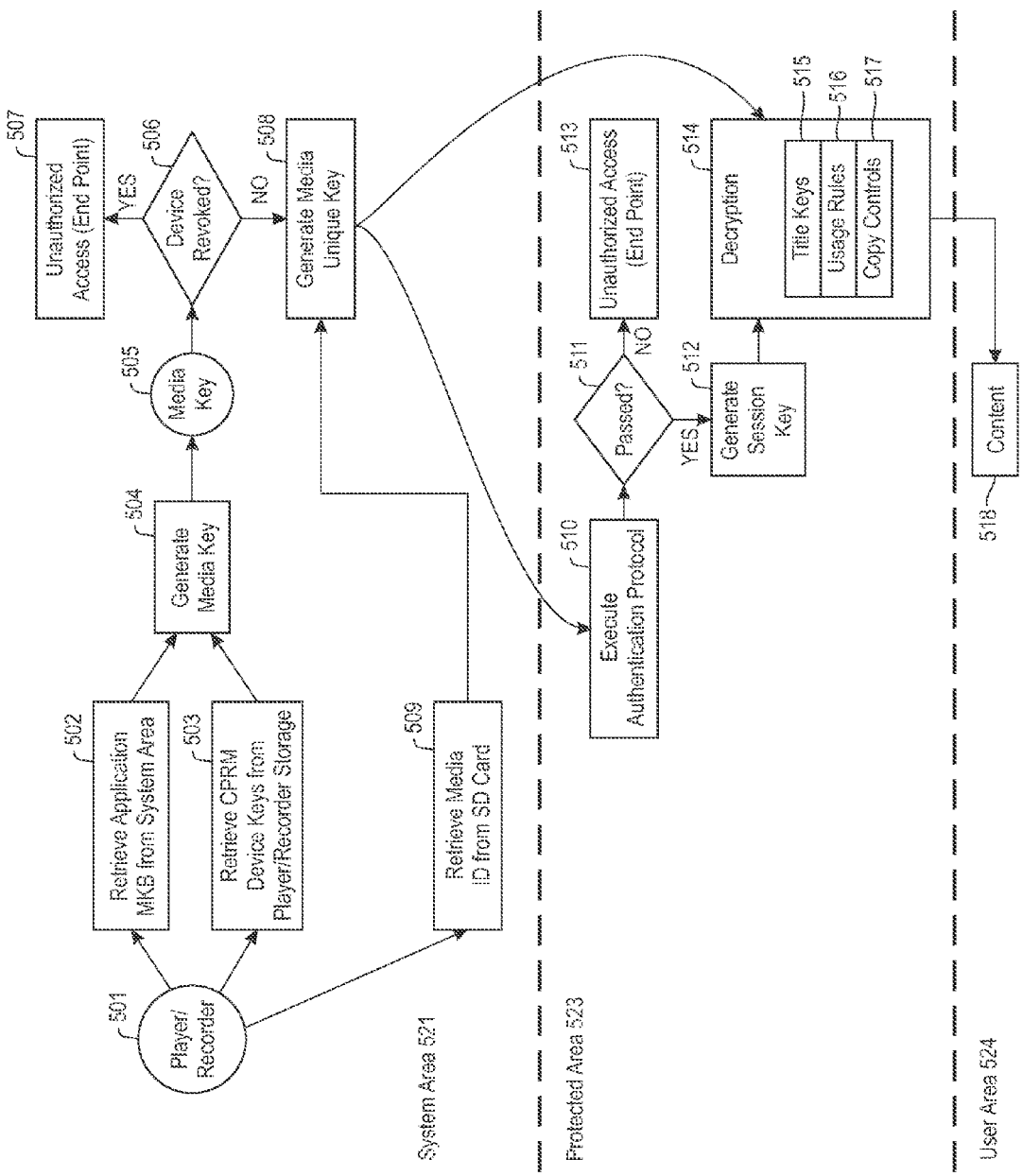
FIG. 5 illustrates a flow chart of an exemplary processing of media key blocks by a content player or recorder to access protected content in an SD memory card.

FIG. 5 illustrates a flow chart of an exemplary processing 500 of media key blocks by a content player or recorder 501 to access CPRM-protected content in an SD memory card. At step 502, player or recorder application 501 may retrieve an application MKB 102-105 from the System Area 521. The player or recorder 501 may also retrieve (at step 503) a CPRM device key from a storage area of the player or recorder 501. At step 504, the application MKB 102-105 and CPRM device key are processed to generate a media key 505.

Using the media key 505, the player or recorder 501 verifies at step 506 whether the access to the media by the player or recorder 501 has been revoked. If the access has been revoked, then the accessing device is not authorized to access the protected content on the SD card and the process 500 ends at step 507. If access for the player or recorder 501 has not been revoked, then the media key 505 is combined with a media ID 101 associated with the SD memory card 100, which was retrieved at step 509 from System Area 521 of the SD memory card 100, to generate a Media Unique Key at step 508.

The Media Unique Key from step 508 is used for executing an authentication protocol (step 510) to determine whether the player or recorder 501 has the necessary identification credentials to access protected content on the SD memory card 100. If the player or recorder 501 lacks the required identification credentials, then the device authentication fails and the process 500 terminates at step 513. Otherwise, the process 500 generates a session key at step 512 which is used to encrypt (for a recorder 501) or decrypt 514 (for a player 501) the Title Keys 515, Usage Rules 516, and Copy Controls 517 associated with the player or recorder 501. The encrypted Title Keys 515, Usage Rules 516, and Copy Controls 517 are stored in the Protected Area 523 of an SD memory card. Once the encryption or decryption 514 of the Title Keys 515, Usage Rules 516, and Copy Controls 517 is successful, the player or recorder 501 may access target protected content 518 in the System Area 524 of the SD memory card.

Figure 6:
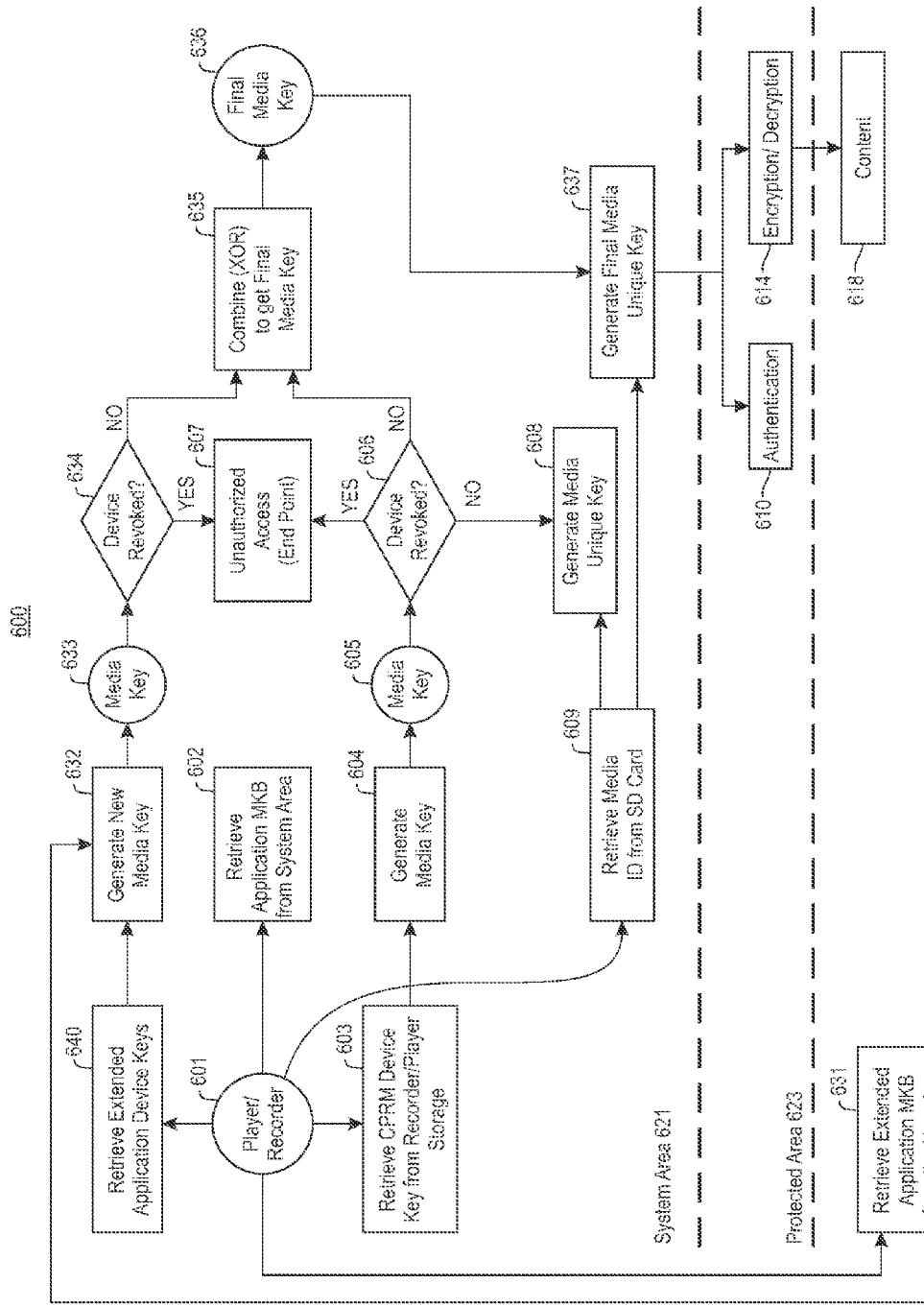
FIG. 6 illustrates a flow chart of an exemplary processing of media key blocks for extended applications by a content player or recorder to access protected content in an SD memory card, in accordance with an embodiment of the invention.

FIG. 6 illustrates a flow chart of an exemplary processing 600 of media key blocks for extended applications by a content player or recorder 601 to access protected contents in an SD memory card 100, according to an embodiment of the invention. At step 602, a player or recorder 601 retrieves an application MKB 102-105 from System Area 621 of the SD memory card 100. The player or recorder 601 also retrieves, at step 603, a CPRM device key from a storage area of the player or recorder 601. The application MKB 102-105 and CPRM device key are processed at step 604 to generate a first Media Key 605. Using the first Media Key 605, the player or recorder 601 verifies at step 606 whether access by the player or recorder 601 to protected content in the SD card 100 has been revoked. If the access permission has been revoked, then the player or recorder 601 is no longer authorized to access the protected content and the process 600 ends at step 607. If access by the device 601 has not been revoked, then process 600 combines the first Media Key 605 with a second media key 633 at step 635 to generate a final Media Key 636.

The generation of the second Media Key 633 is now described. At step 640, the player or recorder 601 retrieves an Extended Applications Device Key from a storage area of the player or recorder 601. The player or recorder 601 further retrieves, at step 631, an extension MKB 115 that is associated with a specific application supported by the player or recorder 601 from the User Area 624 of the SD memory card 100. The Extended Application Device Key is used to process the extension MKB 115 to generate the second Media Key 633 at step 632. Using the second Media Key 633, the player or recorder 601 verifies at step 634 whether access by the player or recorder 601 to protected content for the particular extended application has been revoked. If the access permission has been revoked, then the player or recorder 601 is no longer authorized to access the protected content and the process 600 ends at step 607. If access by the device 601 has not been revoked, then process 600 combines the first Media Key 605 and second Media Key 633 at step 635, e.g., using an XOR operation, to create the final Media Key 636.

The player or recorder 601 further retrieves, at step 609, a media ID 101 associated with the SD memory card 100 from System Area 621 of the SD memory card. The media ID 101 is processed using the first Media Key 605 if device 601's access to content has not been revoked per the determination at step 606 to generate a Media Unique Key at step 608.

The Media Unique Key generated at step 608 is used for executing an authentication protocol (at step 610) to determine whether the player or recorder 601 has the necessary identification credentials to access the media content on the SD memory card. If the player recorder 601 does not have the required identification credentials, then the device authentication 610 fails and the process 600 terminates as described with reference to FIG. 5. Otherwise, a Session Key is generated as described with reference to Session Key generation block 512 in FIG. 5. The media ID 101 is further processed at step 637, using the final Media Key 636 to generate a final Media Unique Key 637.

A recorder 601 encrypts the Title Keys 515, Usage Rules 516, and Copy Controls 517 first with the Final Media Unique Key generated in step 637 and then with the generated Session Key 512, and stores them in the Protected Area 623 of the SD memory card 100. The recorder 601 encrypts the target content and stores it in the User Area 624 of the SD memory card 100.

A player 601 reads the encrypted Title Keys 515, Usage Rules 516, and Copy Controls 517 from the Protected Area 623 of an SD memory card and decrypts them first with the generated Session Key (similar to the Session Key generated from block 512) and then with the Final Media Unique Key generated in step 637. Once the encryption or decryption of the Title Keys 515, Usage Rules 516, and Copy Controls 517 is successful, the player 601 may access the target content 618 in the User Area 624 of the SD memory card 100.

In an embodiment of the invention, the player or recorder 601 may use any of several types of MKB to calculate the second media key 633, and one of several methods of combining the second media key 633 with the first media key 605 to produce a final media key 636, as described below. Example embodiments of the MKBs include:

- CPRM MKB that encodes a 64-bit C2 cipher key as the second media key 633.
- CPRM MKB extension that encodes a 64-bit C2 cipher key as the second media key 633, and requires the first media key 605 and a separate set of device keys to process.
- NNL MKB that encodes a 128-bit AES key as the second media key 633.
- Unified MKB that encodes a variant number and a media key variant, as well as a media key.

Example embodiments of the process for combining the second Media Key 633 with the first Media Key 605 to produce a final Media Key 636 include:

- Replacement: the second Media Key 633 becomes the final Media Key 636. In this case, the MKB 221 in the System Area 106 of the SD card acts a gatekeeper to the Protected Area 113—the device must still successfully process it to read or write the encrypted Title Key 515, Usage Rules 516, and Copy Controls 517.
- XOR: second Media Key 633 is XORed bit-by-bit with the first Media Key 605 to produce a final Media Key 636. If one of the keys is shorter than the other, a pre-defined constant may be appended to the shorter one to extend it to the same length as the longer one.
- Concatenation: second Media Key 633 is appended to the first Media Key 605 to produce a final Media Key 636, or vice-versa. This method can be used to derive a 128-bit AES key from two 64-bit keys.

In all cases the process must use all bits of both keys, and result in an indication that the device is revoked if either media key indicates it is revoked.

In other embodiments of the invention, other types of MKBs and different methods of combining the results of MKB processing to create a final Media Key may be used, as provided by a specific recorder or player application. As an example, for CPRM applications, the SD Association may designate one of the existing CPRM MKBs 102-105 in the System Area 106 for use with Extended Applications. The extension MKB 115 in the User Area 117 for an extended application may be an NNL MKB that requires AES-128 device keys to process and produces a 128-bit AES key as the final Media Key.

For CPXM applications, the SD Association may designate one of the CPXM NNL MKBs 102-105 in the System Area 106 for use with extended applications. The extension MKB 115 in the User Area 117 may be an NNL MKB that requires a separate set of AES-128 device keys to process and produces a 128-bit AES key that is XORed with the first Media Key 605 from the MKB in the System Area 106 to produce the final Media Key 636.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "component" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
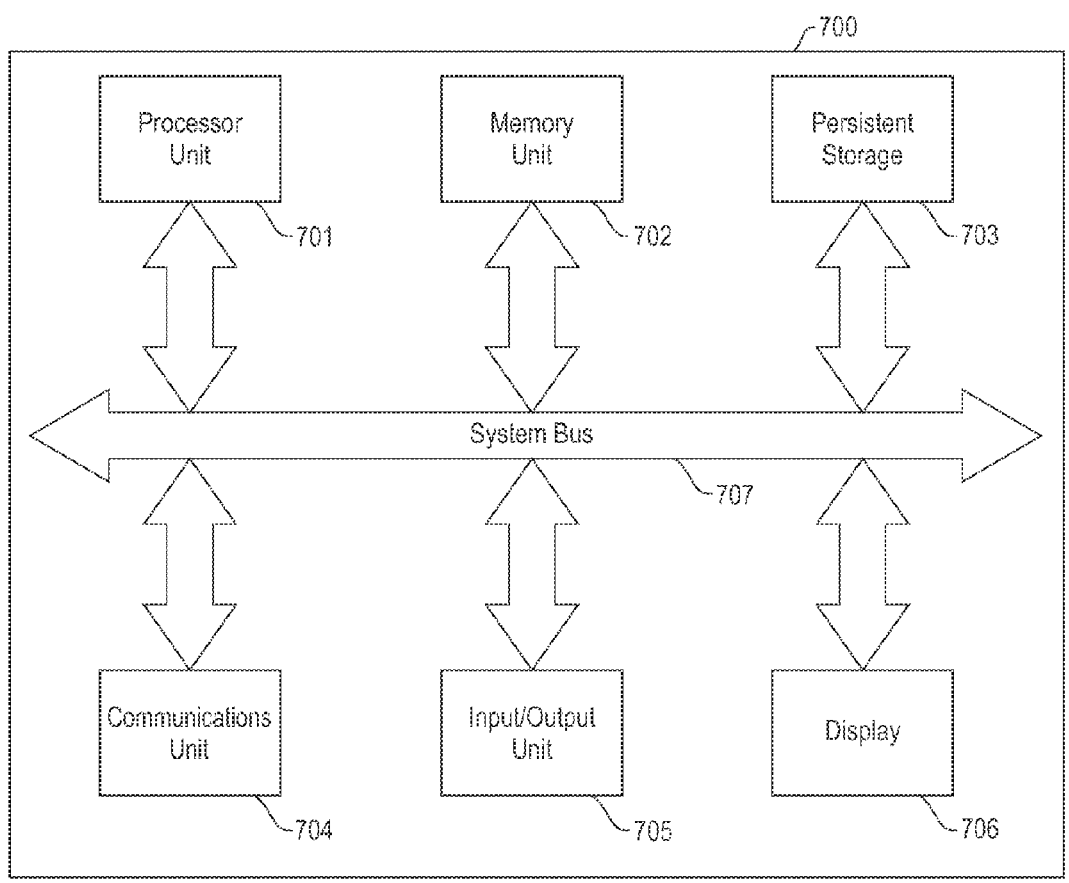
FIG. 7 illustrates an exemplary block diagram of a representative computer for processing media key blocks, encrypting, and decrypting data, in accordance with an embodiment of the invention.

FIG. 7 illustrates an exemplary block diagram of a representative computer 700 which may be used to implement the components and operations described with reference to FIGS. 1-6. Computer system 700 may include a processor unit 701, a memory unit 702, a persistent storage 703, a communications unit 704, an input/output unit 705, a display 706 and a system bus 707. Computer programs are typically stored in persistent storage 703 until they are needed for execution by an operating system, at which time the programs are brought into the memory unit 702 so that they can be directly accessed by the processor unit 701.

The processor unit 701 selects a part of memory unit 702 to read and/or write by using an address that the processor 701 gives to memory 702 along with a request to read and/or write. Usually, the reading and interpretation of an encoded instruction at an address causes the processor 701 to fetch a subsequent instruction, either at a subsequent address or some other address. The processor unit 701, memory unit 702, persistent storage 703, communications unit 704, input/output unit 705, and display 706 interface with each other through the system bus 707.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   retrieving a first media key block on a protected area of a media, the first media key block being previously designated by a media association for new applications accessing protected content stored on the media;
   processing the first media key block with a first device key set to generate a first media key;
   for a particular application among the new applications, processing a second media key block on the user area the media with a second device key set to generate a second media key, the second media key block being previously designated by a licensing entity for the particular application; and
   wherein a content-accessing device, coupled to a processor, uses the first media key and second media key to access the protected content and implements the particular application.

2. The method of claim 1, wherein the first and second keys are processed sequentially.

3. The method of claim 1, wherein the first and second keys are processed concurrently.

4. The method of claim 1, wherein the first and second media keys are combined and processed as a single key.

5. The method of claim 1, wherein the media is selected from a group consisting: a Secure Digital (SD) card, flash media, and DVD.

6. The method of claim 1, wherein the content is protected using a standard selected from the group consisting of: Content Protection for Recordable Media (CPRM) standard and Content Protection for Extended Media (CPXM) standard.

7. The method of claim 1, wherein the first media key block is an updateable media key block.

8. The method of claim 1, wherein the first media key block is a read-only media key block.

9. The method of claim 1, wherein the media association is the SD Association.

10. The method of claim 1, wherein the licensing entity is the 4C Entity.

11. A system, comprising:
    a device for accessing protected content in a media;
    a memory having computer readable instructions; and
    a processor for executing the computer readable instructions, the instructions include:
      retrieving a first media key block on a protected area of a media, the first media key block being previously designated by a media association for new applications accessing protected content stored on the media;
      processing the first media key block with a first device key set to generate a first media key;
      for a particular application among the new applications, processing a second media key block on the user area the media with a second device key set to generate a second media key, the second media key block being previously designated by a licensing entity for the particular application; and wherein using the first media key and second media key to access the protected content and implement the particular application.

12. The system of claim 11, wherein the media is selected from a group consisting: a Secure Digital (SD) card, flash media, and DVD.

13. The system of claim 11, wherein the content is protected using a standard selected from the group consisting of: Content Protection for Recordable Media (CPRM) standard and Content Protection for Extended Media (CPXM) standard.

14. The system of claim 11, wherein the media association is the SD Association.

15. The system of claim 11, wherein the licensing entity is the 4C Entity.

16. A computer program product comprising a non-transitory computer readable storage medium having computer readable program code embodied therewith, the computer readable program code being executable by a processor to:

retrieve a first media key block on a protected area of a media, the first media key block being previously designated by a media association for new applications accessing protected content stored on the media;

process the first media key block with a first device key set to generate a first media key;

for a particular application among the new applications, process a second media key block on the user area the media with a second device key set to generate a second media key, the second media key block being previously designated by a licensing entity for the particular application; and use the first media key and second media key to access the protected content and implement the particular application.

17. The computer program product of claim 16, wherein the content is protected using on a standard selected from the group consisting of: Content Protection for Recordable Media (CPRM) standard and Content Protection for Extended Media (CPXM) standard.

18. The computer program product of claim 16, wherein the media is selected from a group consisting: a SD card, flash media, and DVD.

19. The computer program product of claim 16, wherein the media association is the SD Association.

20. The computer program product of claim 16, wherein the licensing entity is the 4C Entity.

* * * * *